April 11, 1933.  S. OLSON  1,903,473
REMOTE CONTROL CONVEYER SWITCHING SYSTEM
Filed Jan. 8, 1931
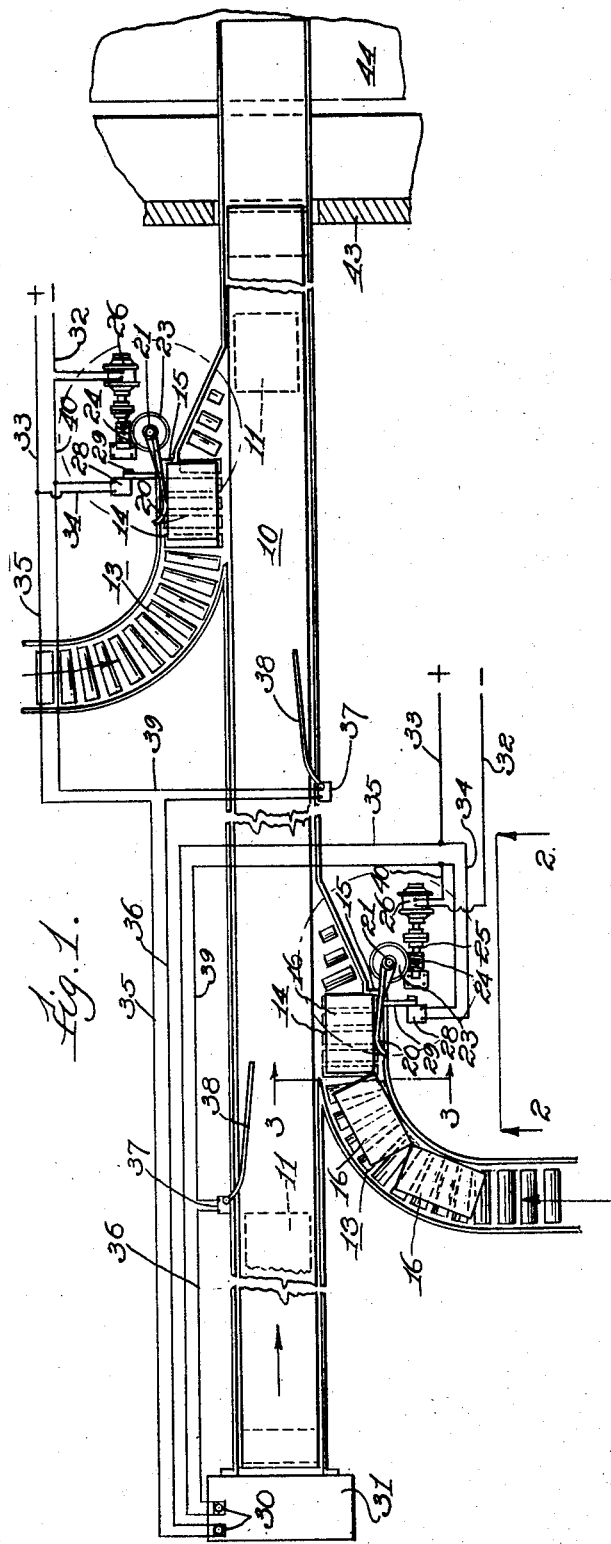
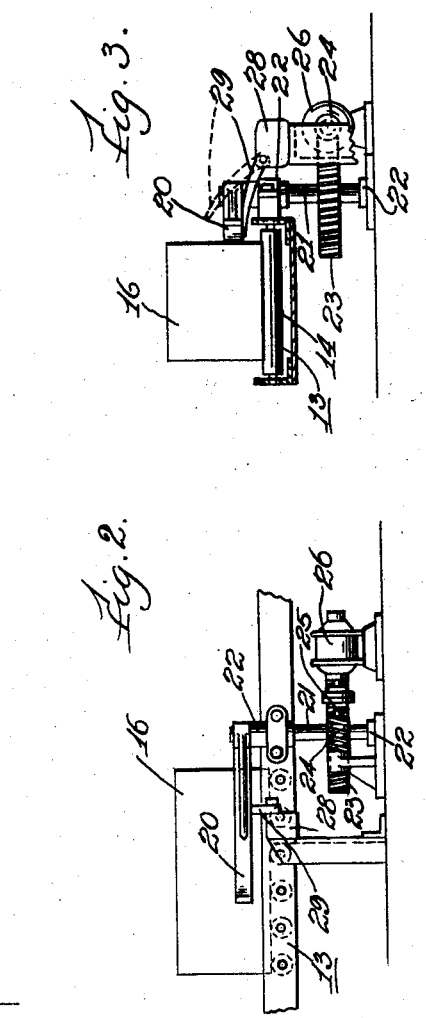
Inventor.
Samuel Olson.
by Burton & Burton
his Attorneys.

Patented Apr. 11, 1933

1,903,473

UNITED STATES PATENT OFFICE

SAMUEL OLSON, OF OAK PARK, ILLINOIS, ASSIGNOR TO SAMUEL OLSON & COMPANY, INC., OF CHICAGO, ILLINOIS, A CORPORATION OF ILLINOIS

REMOTE CONTROL CONVEYER SWITCHING SYSTEM

Application filed January 8, 1931. Serial No. 507,329.

This invention relates to conveyer systems, and more particularly to a system in which load units of different character or classes are fed from branch runways or stations along a main conveyor onto the main conveyor and in which the feeding runways normally serve to provide storage accommodation for the load units. One of the objects of this invention is to provide an improved conveyer system having means for selectively feeding load units from any one of the runways onto the main conveyor. Another object is to provide an improved system including means for remotely controlling the selective feeding of the load units from the storage runways onto the main conveyor. A still further object of this invention is to provide in a system of this character, means for preventing collisions of load units on the conveyor with the load units as they are fed from the branch runways. It consists of certain elements and features of construction in combination, as herein shown and described, and as indicated by the claims.

In the drawing:

Figure 1 is a somewhat diagrammatic plan view of a conveyer system embodying the present invention.

Figure 2 is a side elevation of the ejecting mechanism, taken as indicated at line, 2—2, on Figure 1.

Figure 3 is a sectional view taken substantially at line, 3—3, on Figure 1.

The present invention, as indicated in the drawing includes a horizontally traveling main conveyer, 10, which may be of any desired type, and for convenience, is herein shown as an endless belt conveyor on which the load is indicated at 11. It is understood that wherever the term "load" or "load unit" is used throughout the specification and claims, it has reference either to the so-called "load carrier" or an actual load in the nature of a box, carton, etc. Disposed along the path of travel of the main conveyer are a plurality of branch feeding stations which preferably, as shown diagrammatically, are in the nature of runways, 13, either in the form of a chute or, as indicated in the drawing, a gravity roll conveyer. The terms "runway" and "station", as used throughout the specification and claims are synonymous in meaning. Each of these branch feeding runways are preferably inclined downward toward the main conveyer and include terminal portions, 14, which extend parallel to the main conveyer and are formed with stops or bumpers, 15, for arresting the loads, 16, which tend to move to the bottom of the inclined runway. In the arrangement herein shown the runways, 13, preferably serve to provide storage accommodations for the load units, 16, immediately adjacent the main conveyer, 10, so that they may be quickly fed thereto, and the load units on a runway are of the same general character or class of merchandise.

Power driven load-ejecting mechanism is provided adjacent the main conveyer at each of the branch feeding stations or runways, and each of these mechanisms include a horizontally rotatable load-ejecting arm, 20, rigidly mounted on the upper end of a vertical drive shaft, 21, which is journaled at its lower end in bearings, 22. A worm gear, 23, is secured on said shaft adjacent the lower end and is operatively driven by a worm, 24, on the drive shaft, 25, of the electric motor, 26. Connected in the motor circuit is a normally open switch, 28, which controls the operation of the load-ejecting arm, 20, and causes arresting of the same after each single revolution. As may be seen in Figure 1 of the drawing, this load-ejecting arm is positioned so as to engage the side of the load, 16, for forcibly shifting it transversely onto the main belt conveyer, 10. The load-ejecting mechanism at these respective branch feeding runways is selectively operable and preferably, as shown, is remotely controlled, and each of the electrical circuits include a push button, 30, located at a central control platform, 31, which is located and arranged to overlook the operation of the entire system. All of the electrical circuits for the respective feeding stations or runways are alike and the description for one will suffice for all.

The motor circuit includes a main power line, 32, which is connected directly to the motor, 26, while the other main power line, 33, is connected to two branch conductors, 34 and 35, leading to the normally open switch, 28, and to the push button, 30, respectively. A conductor, 36, connects the other terminal of the push button to a normally closed safety switch, 37, which is located along the path of travel of the main conveyer, 10, forwardly of the junction with the corresponding runway, 13, and includes an operating arm, 38, which normally extends over the main conveyer, 10, in the path of travel of the loads, 11. A conductor, 39, connects the other terminals of the switches, 37 and 28, with a branch conductor, 40, connecting conductor, 39, directly with the motor to complete the electrical circuit. Thus an operator at the central control platform may selectively operate the ejecting mechanism at any of the branch feeding stations or runways merely by pressing the corresponding push button, 30, to close the electrical circuit.

When the push button, 30, is depressed to close the electrical circuit controlling the ejector mechanism at one of the branch feeding stations, the button need be held down only momentarily since the motor, 26, immediately commences to drive or rotate the ejecting arm, 20, which engages the loads, 16, at the terminal portion, 14, of the runway and forcibly shifts it onto the main conveyer, 10. It will be apparent that shortly after the arm, 20, commences to rotate, it will disengage or release the spring finger, 29, of the normally open switch, 28, permitting it to close, as indicated in dotted lines in Figure 3, and thereby complete another electrical circuit so as to insure continuous operation of the ejecting mechanism after the push button is released. After the arm, 20, has ejected the load and has completed the single cycle, it again encounters the switch arm, 29, and depresses it, breaking the electrical circuit and thus arresting the mechanism with the arm, 20, in position ready to repeat the operation.

The switch, 37, is provided to avoid collisions between the loads, 11, on the main conveyer and the loads, 16, as they are fed thereon from the respective branch feeding runways, 13. Upon inspection of the drawing it will be seen that this switch is connected in the electrical circuit in series, and since the switch, 37, is normally closed, the load-ejecting mechanism is normally under the control of the push button, 30. However, in the event that a load, 11, on the main conveyer encounters the arm, 38, opening the switch, 37, and breaking the circuit of the load-ejecting mechanism, the load-ejecting mechanism is positively rendered inoperative until said load, 11, on the main conveyer, 10, passes beyond and releases the switch arm, 38, at which time this load, 11, will be free from possible collision with the loads being fed from the adjacent runway.

This system may be advantageously employed under various conditions, as for example, in a shipping department where each of the runways or branch feeding stations, 13, serve to provide storage accommodations for a plurality of load units of the same character or class. Since the ejecting mechanisms are arranged to discharge only a single load each time it is actuated, it will be evident that the operator on the platform, 31, may cause a group of any particular class of load units on these runways to be delivered onto the main conveyer, 10, by repeatedly operating the control button, 30, corresponding to the particular feeding station. And when a given order for a shipment of goods is to consist of articles of goods of different classes, he can deliver them in proper groups onto the main conveyer, 10, by which they will be carried to the shipping platform situated outside the wall of the building as indicated at 43, or even into a railroad car as indicated at 44. This method of making up shipments composed of articles from several different compartments or localities in a building will save much of the confusion and running about which is incident to the use of hand trucks for the purpose, and will also considerably reduce the number of employees required for this work. It will of course be understood that the feeding stations or conveyer runways may come from widely separated departments of the plant or may extend only short distances from storage spaces for the different classes of merchandise in a warehouse building.

I claim:—

1. In combination with a main conveyer, a plurality of branch feeding runways adjacent the main conveyer and arranged to serve as storage for a plurality of load units, means adjacent each feeding runway for discharging load units one at a time onto the main conveyer; selective control means for actuating any of said load-discharging means of the respective feeding runways, and means extending into the path of travel of loads on the main conveyer, forwardly of the junction of the main conveyer with a corresponding branch feeding runway, adapted when engaged by a load on said conveyer for rendering the said discharging means temporarily inoperative.

2. In a conveyer system, a main conveyer with a plurality of branch feeding runways extending transversely along said main conveyer, each runway together with the main conveyer having a junction at which loads are transferred from one to the other, electrically controlled load-ejecting means adjacent each junction, and remotely controlled means for selectively rendering any one of said ejecting means operative, said load ejecting means including an electric driving motor, a rotary arm driven by said motor and arranged for engaging and forcibly shifting said load during the ejecting operation, a switch connected in the motor circuit and normally held in open position by the rotary arm and adapted to be released for completing the motor circuit after said arm has been set in motion.

3. In the combination defined in claim 2, said switch being adapted for engagement by said arm after it completes the ejecting operation and thereby automatically breaking the motor circuit and arresting said arm.

4. In the combination defined in claim 2, a second switch connected in the motor circuit including an arm extending in the path of travel of the loads on the main conveyer forwardly of the junction of said conveyer with the corresponding runway, said second switch being adapted when its arm is engaged by a load on the conveyer for rendering said ejecting means temporarily inoperative.

5. In combination with a main conveyer, a plurality of branch feeding runways adjacent the main conveyer and arranged to serve as storage for a plurality of load units, means adjacent each feeding runway for discharging load units one at a time onto the main conveyer; selective control means for actuating any of said load discharging means of the respective feeding runways, and means adapted to project into the path of travel of the loads on the main conveyer, forwardly of the junction of the main conveyer with a corresponding branch feeding runway, operative by registration of a load therewith for rendering said load-discharging means temporarily inoperative.

SAMUEL OLSON.